US012585679B2

(12) United States Patent
Zhong et al.

(10) Patent No.: US 12,585,679 B2
(45) Date of Patent: Mar. 24, 2026

(54) EXECUTING UNSUPERVISED PRE-TRAINING TASKS WITH A MACHINE LEARNING MODEL TO PREDICT DOCUMENT GRAPH ATTRIBUTES

(71) Applicant: Oracle International Corporation, Redwood Shores, CA (US)

(72) Inventors: Xu Zhong, Vermont South (AU); Don Dharmasiri, Victoria (AU); Thanh Long Duong, Point Cook (AU); Mark Johnson, Castle Cove (AU); Srinivasa Phani Kumar Gadde, Fremont, CA (US); Vishal Vishnoi, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 181 days.

(21) Appl. No.: 18/298,060

(22) Filed: Apr. 10, 2023

(65) Prior Publication Data

US 2024/0338395 A1     Oct. 10, 2024

(51) Int. Cl.
*G06F 40/284*         (2020.01)
*G06F 16/3329*        (2025.01)
*G06F 40/205*         (2020.01)

(52) U.S. Cl.
CPC ........ *G06F 16/3329* (2019.01); *G06F 40/205* (2020.01); *G06F 40/284* (2020.01)

(58) Field of Classification Search
None
See application file for complete search history.

(56) References Cited

U.S. PATENT DOCUMENTS

2020/0097389 A1*  3/2020  Smith ................. G06F 11/0793
2021/0286989 A1   9/2021  Zhong et al.
                    (Continued)

FOREIGN PATENT DOCUMENTS

CN      111125358 A    5/2020
CN      112307773 A    2/2021
                  (Continued)

OTHER PUBLICATIONS

Yao et al. ComQA: Compositional Question Answering via Hierarchical Graph Neural Networks, Woodstock '18, Jan. 16, 2021 (Year: 2021).*

(Continued)

*Primary Examiner* — Pierre Louis Desir
(74) *Attorney, Agent, or Firm* — Invoke

(57) ABSTRACT

Techniques for multi-layer training of a machine learning model are disclosed. A system pre-trains a machine learning model on training data obtained from unlabeled document graph data by executing unsupervised pre-training tasks on the unlabeled document graph data to generate a labeled pre-training data set. The system modifies document graphs to change attributes of nodes in the document graphs. The system pre-trains the machine learning model with a data set including the modified document graphs and un-modified document graphs to generate prediction associated with the modifications to the document graphs. Subsequent to pre-training, the system fine-tunes the machine learning model with a set of labeled training data to generate predictions associated with a specific attribute of a document graph.

20 Claims, 8 Drawing Sheets

100

110

Content Retrieval Platform

Document graph generating engine 111

Document Graph 112

130

Pre-Training Data Set 131

Documents 132

Document graphs 133

Modified Document graphs 134

135

Labeled Training Data 136

Documents

Document graphs 137

Document graph modification engine 113

Machine Learning Model Engine 114

116
Pre-Trained ML model

115
ML model training engine

Fine-Tuned ML Model 117

140

141

Documents

142
Target Document Attributes

Document Graph Decoder 118

Query Execution Engine 119

User Interface 120

(56) References Cited

U.S. PATENT DOCUMENTS

| | | | |
|---|---|---|---|
| 2022/0147838 A1 | 5/2022 | Gu et al. | |
| 2022/0171936 A1* | 6/2022 | Wang | G06F 40/289 |
| 2022/0245337 A1 | 8/2022 | Wu et al. | |
| 2024/0331008 A1* | 10/2024 | Jalan | G06Q 50/01 |

FOREIGN PATENT DOCUMENTS

| | | | |
|---|---|---|---|
| CN | 112925907 A | 6/2021 | |
| CN | 111401928 B | * 4/2022 | G06F 16/3344 |

OTHER PUBLICATIONS

Riba et al. Table detection in business document images by message passing networks, Elsevier Ltd, Mar. 8, 2022 (Year: 2022).*
Hu. Z. et al., "GPT-GNN Generative Pre-Training of Graph Neural Networks," In Proceedings of the 26th ACM SIGKDD Conference on Knowledge Discovery and Data Mining (KDD '20), Aug. 23-27, 2020, Virtual Event, CA, USA. ACM, New York, NY, USA, pp. 11.
Lu. Y. et al., "Learning to Pre-train Graph Neural Networks," Proceedings of the AAAI Conference on Artificial Intelligence Current Archives About, vol. 35, Issue 5, 2021, pp. 11.
Wang. B. et al., "ComQA:Compositional Question Answering via Hierarchical Graph Neural Networks," In Woodstock '18: ACM Symposium on Neural Gaze Detection, 2018, pp. 12.
Yang. X. et al., "Learning to Extract Semantic Structure from Documents Using Multimodal Fully Convolutional Neural Networks," Proceedings of the IEEE Conference on Computer Vision and Pattern Recognition (CVPR), 2017, pp. 16.
Yasunaga. M. et al., "QA-GNN: Reasoning with Language Models and Knowledge Graphs for Question Answering," Stanford University, 2021, pp. 12.
Zuo. S. et al., "DIP-GNN: Discriminative Pre-Training of Graph Neural Networks," Georgia Institute of Technology, 2022, pp. 15.
Lu et al., "Weakly Supervised Concept Map Generation Through Task-Guided Graph Translation", IEEE Transactions on Knowledge and Data Engineering, vol. 35, Issue 10, Oct. 1, 2023, pp. 10871-10883.

* cited by examiner

100

222 — Obtain query including query terms

224 — Identify document content matching query terms

226 — Parse document to identify defined grammatical structural elements

228 — Generate document graph based on defined grammatical structural elements

230 — Apply machine learning model to document graph

232 — Present query response based on identified target attributes

303

305a

EXECUTING UNSUPERVISED PRE-TRAINING TASKS WITH A MACHINE LEARNING MODEL TO PREDICT DOCUMENT GRAPH ATTRIBUTES

TECHNICAL FIELD

The present disclosure relates to executing unsupervised pre-training tasks on a machine learning model prior to training the machine learning model to predict particular attributes of document graphs. In particular, the present disclosure relates to implementing unsupervised tasks to generate an un-labeled set of training data including modified document graphs and un-modified document graphs. The system pre-trains a machine learning model with the set of training data.

BACKGROUND

Machine learning models allow for analyzing and classification of document content in quantities and at speeds beyond those of humans. However, training machine learning models to classify content within documents generally requires large quantities of training documents with corresponding classification label. During training, the classification labels tell the model-training engine whether the model's prediction was correct or incorrect. Generating classification labels in a training data set is time-intensive. In addition, some types of documents may not be available in sufficient quantities to provide desired levels of accuracy in a trained machine learning model.

For example, frequently-asked-question (FAQ)-type documents come in many different types of formats. Questions may be arranged above answers, to the left side of answers, or to the right side of answers. Questions may have the same, or different, formatting than the corresponding answers. Given the many different styles and formats of FAQ-type documents, it can be challenging and time-consuming to generate a training data set to train a machine learning model to identify contents of FAQ-type documents. The training data set may not include enough examples of each different type of layout for the model to adequately learn to classify the contents of the documents. The model may have a high level of accuracy when predicting document content for one type of FAQ layout—such as questions arranged above answers—and a low level of accuracy when predicting document content for another type of FAQ layout—such as questions and answers in different columns.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
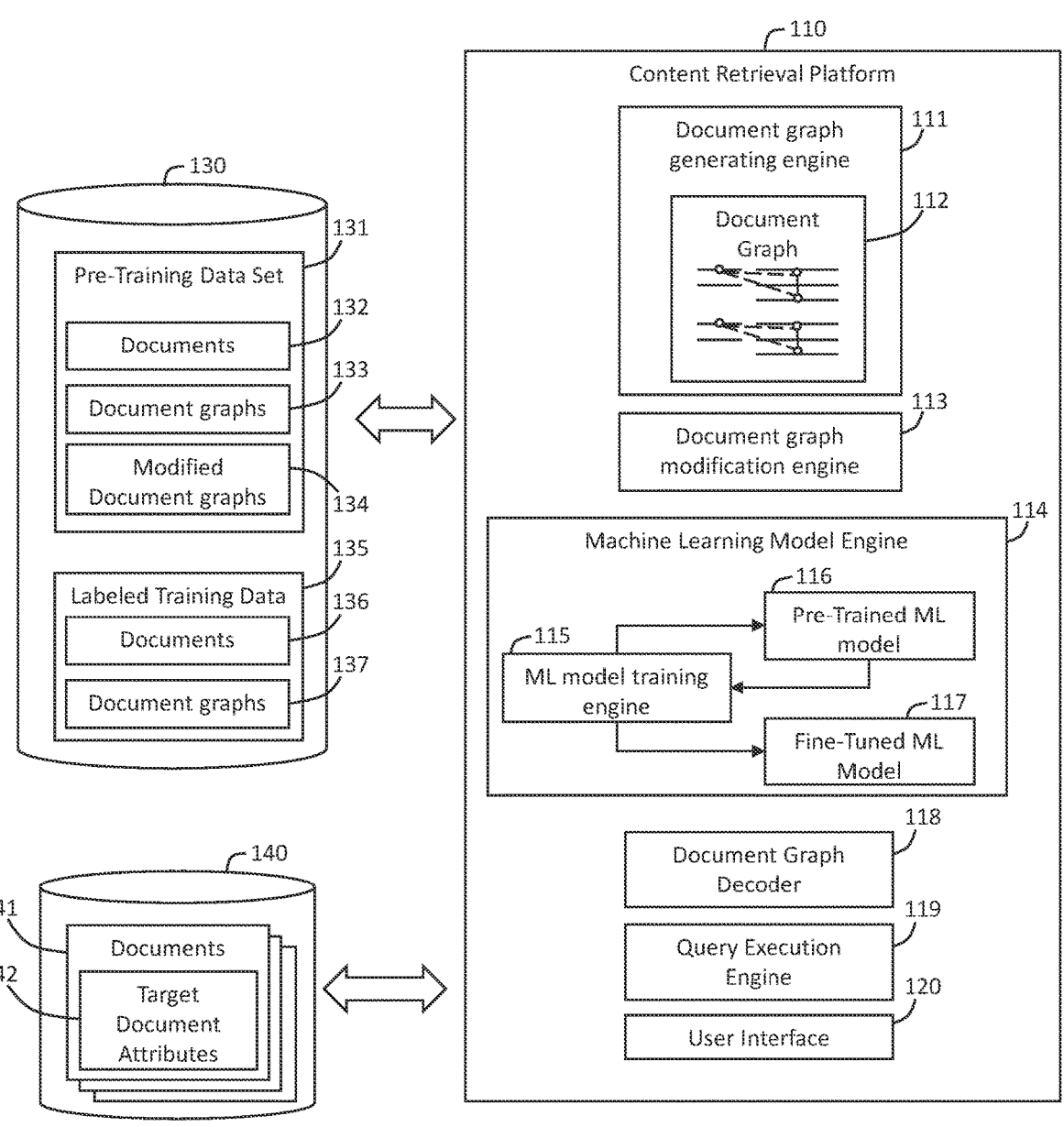
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MULTI-STAGE TRAINING OF A MACHINE LEARNING MODEL TO CLASSIFY DOCUMENT CONTENT
4. EXAMPLE EMBODIMENT
5. COMPUTER NETWORKS AND CLOUD NETWORKS
6. MISCELLANEOUS; EXTENSIONS
7. HARDWARE OVERVIEW

1. GENERAL OVERVIEW

Systems utilize machine learning to identify and categorize content in digital documents. However, machine learning models encounter difficulty identifying and categorizing content when training data sets are relatively small and when documents in a training data set have a high variability in document layout.

One or more embodiments perform unsupervised pre-training tasks to modify unlabeled document graph data to generate a pre-training data set for training a machine learning model. A system pre-trains a machine learning model by providing modified document graph data as input training data. According to one or more embodiments, the system may also provide unmodified document graph data as input training data. The machine learning model generates a prediction associated with the modified document graph data as output data. For example, the prediction may include predicting masked text information, or predicting an embedding for masked text information, from a modified document graph. Alternatively, the prediction may include identifying whether text content for a node in a document graph has been swapped with text information from another node. The system compares the prediction generated by the machine learning model to the attributes of an unmodified document graph associated with the modified document graph input data, or to ground truth embeddings of graph content, to determine whether the machine learning model's prediction is correct. The system iteratively updates parameters of the machine learning model to increase the accuracy of the machine learning model's predictions prior to fine-tuning the machine learning model to predict particular document graph attributes, such as graph content embeddings.

Subsequent to pre-training the machine-learning model with the data set of pre-training data obtained from unlabeled document graphs, the system fine-tunes the machine learning model with a set of labeled data to perform a target task, such as predicting particular document graph attributes.

While the pre-training results in predictions associated with whether a document graph has been modified, the re-training results in a fine-tuned machine learning model predicting particular attributes of document graphs. For example, the fine-tuned machine learning model may predict whether nodes are part of key-value pair groupings or tables in a document. A system may fine-tune the machine learning model by, for example, training one or more layers of the pre-trained model using labeled training data and/or by adding a classification head to the model and training the classification head using the labeled training data.

One or more embodiments modify a document graph by masking text information in the document graph. The machine learning model predicts what is the masked text information. For example, the document graph is made up of nodes connected by edges. The nodes correspond to sentences in a document. The edges represent relationships among the sentences. The system may perform a text masking pre-training task by omitting text information from one or more nodes in the document graph. Text information may include one or more of text content, text style information, and position information of the text. The machine learning model predicts what the text information missing from the document graph is. The system compares the machine learning model's prediction with the actual masked text information and adjusts the parameters of the machine learning model accordingly. According to an embodiment, text content is masked from one or more nodes representing sentences in a document and ground truth embeddings for the masked sentences are determined using a text embedding model, such as the MUSE model. The machine learning model is trained to predict embeddings of the masked text content using the ground truth embeddings.

One or more embodiments modify the document graph by modifying text content in the document graph. For example, the system may swap the text content of two nodes connected to the same edge. The machine learning model receives document graph data as input data and predicts whether any edges in the document graph connect nodes with swapped text content. In addition, or in the alternative, the machine learning model may predict whether a particular node includes text content that has been swapped with a neighbor node along an edge.

One or more embodiments modify the document graph by replacing text content of a particular node with text content from a node in a different document graph. The machine learning model receives document graph data as input data and predicts whether any nodes in the document graph include text content from another node in a different document graph.

The document graphs in the training data sets represent sentences within the documents as nodes. The nodes include sentence content as well as additional text information, such as font style and node location within the document. The document graph includes edges connecting the nodes. The edges include information describing a relationship between two nodes, such as relationships based on font style, coordinate location, and/or read-order location between the two nodes. The pre-trained model may be fine-tuned to accomplish one or more downstream tasks using further labeled data. For example, the fine-tuned machine learning model is configured to analyze document graph data to identify particular target attributes associated with nodes and edges in the document graph. For a further example, the fine-tuned machine learning model may classify nodes and edges as being associated with key-value pair groupings or with tables in a document.

One or more embodiments described in this Specification and/or recited in the claims may not be included in this General Overview section.

2. SYSTEM ARCHITECTURE

FIG. 1 illustrates a system 100 in accordance with one or more embodiments. As illustrated in FIG. 1, system 100 includes a content retrieval platform 110. The content retrieval platform 110 may be implemented as a digital assistant, for example. Users may interact with the digital assistant via the user interface 120 to generate queries. For example, a user may speak or type a question. The query execution engine 119 parses the question to identify query terms. The query execution engine 119 identifies documents 141 in a data repository 140 having words matching the query terms. In addition, or in the alternative, the content retrieval platform 110 may be implemented as an application running on a computing device, or a bot.

In one or more embodiments, a data repository 140 is any type of storage unit and/or device (e.g., a file system, database, collection of tables, or any other storage mechanism) for storing data. Further, a data repository 140 may include multiple different storage units and/or devices. The multiple different storage units and/or devices may or may not be of the same type or located at the same physical site. Further, a data repository 140 may be implemented or may execute on the same computing system as the content retrieval platform 110. Alternatively, or additionally, a data repository 140 may be implemented or executed on a computing system separate from the content retrieval platform 110. A data repository 140 may be communicatively coupled to the content retrieval platform via a direct connection or via a network.

Information describing documents 141 may be implemented across any of components within the system 100. However, this information is illustrated within the data repository 140 for purposes of clarity and explanation.

The content retrieval platform 110 includes a machine learning model engine 114. The machine learning model engine 114 (1) pre-trains a machine learning model to identify modifications to document graphs, and (2) fine-tunes the machine learning model to identify target document attributes, such as the target document attributes 142 in documents 141.

A document graph generating engine 111 generates a document graph 112 from a document 141. The document graph generating engine 111 identifies defined grammatical structural elements in the document. The document graph generating engine 111 generates a node for each defined grammatical structural element. According to one embodiment, the defined grammatical structural element is a sentence. In other words, the document graph generating engine 111 generates a separate node for each sentence in the document. In addition, the document graph generating engine 111 generates a node for grammatical elements in the document that are not part of a sentence or paragraph structure, such as: a page number, a date, a web address, a document title, a document subtitle, and a list of items in non-sentence format. Each node in the document graph includes information about the corresponding grammatical structural element. For example, a node corresponding to a sentence in a document includes: text content, text style information, such as color, italic, font, and size information, and position information describing a position of the sentence within the document.

The document graph generating engine 111 generates edges connecting the nodes. The document graph generating engine 111 generates an initial set of edges based on distances between nodes. For example, the document graph generating engine 111 may generate edges between any two nodes within a defined distance of each other in the document, such as within 100 pixels of each other. According to one example, the document graph generating engine 111 compares a coordinate position of a particular node with the coordinate positions of nodes located above, below, and to the sides of the particular node. If the nodes are within a predefined distance of each other, in the horizontal and/or vertical directions, the document graph generating engine 111 generates an edge connecting the nodes.

In addition, or in the alternative, document graph generating engine 111 may generate edges between any two nodes within a defined reading order of each other. For example, the document graph generating engine 111 may set a reading order threshold to 2. From a center node, the document graph generating engine 111 generates an edge between the center node and (a) an immediately preceding node in a reading order, (b) a node preceding the immediately preceding node in the reading order, (c) an immediately following node in the reading order, and (d) a node following the immediately following node in the reading order. According to one example, document graph generating engine 111 logically combines the reading order requirement and the position of the node requirement to determine whether to generate an edge. For example, document graph generating engine 111 may generate an edge between any two nodes that are (a) within two nodes of each other in reading order, and (b) within a predefined distance of each other in a coordinate system. According to one embodiment, determining a position of a node within a document includes determining, in a coordinate system, (a) a position of a right edge of the grammatical element corresponding to the node, (b) a position of a left edge of the grammatical element corresponding to the node, (c) a position of a bottom edge of the grammatical element corresponding to the node, and (d) a position of a top edge of the grammatical element corresponding to the node.

The system converts the information in the nodes describing grammatical elements and in the edges describing relationships between grammatical elements into vectors for input into the machine-learning model. Such vectors may be generated using any kind of data preprocessing. For example, the system may generate a set of n vectors for the nodes in a document graph and a set of m vectors for the edges. The vectors in the nodes encode values for text content, font weight (such as regular, italic, bold, combinations of bold and italic, etc.), and the location in the page of the sentence (such as the coordinates corresponding to the left, right, top, and bottom edges of the sentence in the document). Edges represent relationships between nodes. The vectors in the edges encode values representing relative relationships between: font size (is a font size of one node greater, equal to, or less than the font size of the other node), font color (is the font size of one node the same, or different from, the font size of the other node), a page (are two nodes on the same page or different pages), a relative reading order of the nodes (is one node in a reading order position preceding, or following, the other node), and a relative layout of the nodes (what is the difference between (a) the left edges of the nodes, (b) the right edges of the nodes, (c) the tops of the nodes, and (d) the bottoms of the nodes, and what are the horizontal and vertical distances between the nodes (e.g., what is a difference between the left side of one node and the right side of the other node)).

The machine learning model engine 114 applies a fine-tuned machine learning model 117 to the document graph 112 to identify target document attributes 142 in the document 141. For example, target document attributes may include: key-value pairs or tables. In particular, the fine-tuned machine learning model 117 (a) receives as input data the sets of vectors encoding information for the nodes and edges in the document graph 112, and (b) generates embeddings encoding identified target document attributes 142 in the document graph 112.

The machine learning model engine 114 includes a machine learning model training engine 115 to train the machine learning model. The machine learning model training engine 115 obtains training data sets from a data repository 130. The machine learning model training engine 115 performs a pre-training process using a pre-training data set 131 to pre-train the machine learning model, generating a pre-trained machine learning model 116. The machine learning model training engine 115 performs a fine-tuning training of the machine learning model using the labeled training data 135 to generate the fine-tuned machine learning model 117.

The pre-training data set 131 includes at least a set of modified document graphs 134. The pre-training data set 131 may also include a set of un-modified document graphs 133. According to one embodiment, the content retrieval platform 110 generates the set of document graphs 133 by providing a set of unlabeled training documents 132 to the document graph generating engine 111. The document graph generating engine 111 generates the document graphs 133, including nodes representing grammatical elements (such as sentences) and edges connecting nodes, based on the content of the documents 132, as described previously.

The content retrieval platform 110 provides a pre-defined number of the document graphs 133 to the document graph modification engine 113 to generate the modified document graphs 134. The document graph modification engine 113 performs automated document graph modification tasks, without human intervention, to generate the modified document graphs 134.

According to one example, a document graph modification task includes masking text information within a node of a document graph. For example, the document graph modification engine 113 may mask text content for the node. The machine learning model engine 114 applies the modified document graph data, omitting the masked text content, to the machine learning model training engine 115 as input training data. The machine learning model training engine 115 trains the machine learning model to predict the masked text information. In other words, in an example in which the modified document graph includes masked text content for one or more nodes, the machine learning model predicts the text content. The machine learning model training engine 115 may use an un-modified document graph, from which the modified document graph was generated, to determine the accuracy of the prediction of the machine learning model. Accordingly, the un-modified document graph with the text information included may serve as a label for the modified document graph with the text information masked.

According to another example, the document graph modification engine 113 masks text content for the node, and a text embedding model (such as the MUSE model) is used to generate ground truth embeddings of the masked text content. The machine learning model engine 114 applies the modified document graph data, which includes masked text content, to the machine learning model training engine 115 as input training data. The machine learning model training engine 115 trains the machine learning model to predict an embedding of the masked text information. The machine learning model training engine 115 uses the ground truth embeddings to determine the accuracy of the embedding prediction of the machine learning model and to perform back-propagation to refine the machine learning model.

According to another example, a document graph modification task includes swapping text content of two nodes connected by an edge in a document graph. For example, the document graph modification engine 113 may change text content of one node with text content of another node. The machine learning model engine 114 generates a set of input data with the swapped text content of the two nodes. Each node in the input data is automatically labeled to indicate whether the node was swapped or unchanged. The machine learning model engine 114 applies the machine learning model 116 to the input data. The machine learning model training engine 115 trains the machine learning model 116 to predict at least one of (a) whether a particular edge connects two nodes having swapped text content, and (b) whether a particular node includes swapped text content. The machine learning model training engine 115 uses the automatically-generated labels on the input data to determine the accuracy of the prediction of the machine learning model 116.

According to another example, a document graph modification task includes replacing text content of a particular node in one document graph with text content from a node in a different document graph. The machine learning model engine 114 generates a set of input data in which text content for one or more nodes is replaced by text content for one or more other nodes from a different document graph. Each node in the input data is automatically labeled to indicate whether the node was replaced or unchanged. The machine learning model engine 114 applies the modified document graph data, with the replaced text content for one or more nodes, to the machine learning model training engine 115 as input data. The machine learning model training engine 115 trains the machine learning model to predict whether the text content for any nodes in the document graph have been replaced with text content from any node in a different document graph. The machine learning model training engine 115 uses the automatically-generated labels on the input data to determine the accuracy of the prediction of the machine learning model 116.

According to one embodiment, the document graph modification engine 113 executes multiple different document graph modification tasks, without human intervention, on the same document graph. For example, the document graph modification engine 113 may apply a rule to modify 10% of the nodes in a document by swapping text content of nodes connected by the same edge and to modify another 10% of the nodes in the document by replacing text content of nodes in one document with text content from nodes in another document. In addition, the document graph modification engine 113 may apply a rule to modify a particular percentage of the document graphs 133 to generate the modified document graphs 134. For example, the document graph modification engine 113 may apply a rule to modify 50% of the document graphs 133. Accordingly, the machine learning model training engine 115 trains the machine learning model to generate the pre-trained machine learning model 116 using a data set made up of 50% document graphs 133 that have not been modified and 50% modified document graphs 134.

In some examples, one or more elements of a machine learning engine may use a machine learning algorithm to identify modifications in document graphs. A machine learning algorithm is an algorithm that can be iterated to learn a target model f that best maps a set of input variables to an output variable, using a set of training data. The machine learning algorithm may include unsupervised components to learn the relationships among components of document graphs. A machine learning algorithm generates a target model f such that the target model f best fits the training data. The machine learning model engine 114 trains the machine learning model 116 based on the training data, as indicated above, which results in a model that has good understanding of the semantics of document graphs at the grammatical element (e.g., sentence) level. For example, training the model to predict embeddings of masked sentences gives the model the ability to understand good semantical representations of sentences. As another example, training the model to predict whether text content of nodes is swapped in a document graph gives the model the understanding of text semantics within a document graph structure. As a further example, training the model to predict whether nodes are replaced in a document graph with text content from another document gives the model the understanding of what grammatical elements belong together, i.e., within a given document.

Subsequent to generating the pre-trained machine learning model 116, the machine learning model engine 114 fine-tunes the model on the labeled training data 135, which is labeled based on particular target document attributes to generate a fine-tuned machine learning model 117. The labeled training data 135 includes one or both of documents 136 and document graphs 137. The document graphs 133 and 137 include nodes and edges that include information for grammatical, textual, and positional attributes in the documents 132 and 136. For example, as discussed previously, node attributes include: text font, text content, text style, text weight, text size, and a location, in a coordinate system, of text in the document. Edge attributes include, for a pair of nodes, differences in text size, text font, text color, and text style, differences in a page on which the text is located, a relative read order of one node to another node, and a relative layout of one node compared to another node.

According to one embodiment, fine-tuning the machine learning model 116 includes applying a classification head to the machine learning model and training the classification head and zero or more of the layers of the machine learning model 116. For example, fine-tuning the machine learning model 116 may include: (a) adding one or more layers to the model, freezing the parameters (e.g., weights) of the pre-trained portion of the model, training the model with the parameters frozen on a first set of labeled training data, un-freezing the parameters, and further training the model, with the parameters un-frozen, on a second set of labeled training data.

In the example in which the labeled training data 135 includes documents 136, the document graph generating engine 111 generates the document graphs 137, including nodes representing sentences and edges representing relationships between sentences, from the documents 136. The fine-tuned machine learning model 117 performs a downstream task that utilizes the information from the pre-trained machine learning model 116. For example, according to one embodiment, the fine-tuned machine learning model 117 classifies sentences within documents 141 as belonging to key-value pairs, such as question-answer pairs. According to another embodiment, the fine-tuned machine learning model 117 classifies tokens, such as words and/or numbers, within documents as being part of a table.

The machine learning model engine 115 generates the fine-tuned machine learning model 117 to identify target document attributes 142 in a document using a machine learning algorithm. The machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, back-propagation, and/or clustering. According to one embodiment, the system fine-tunes the same machine learning model using a new data set of labeled document graphs, other than the training data used to pre-train model 116, e.g., with labels corresponding to target document attributes, using an algorithm implementing supervised machine learning techniques.

In an embodiment, the labeled training data 135 includes datasets and associated labels. The datasets are associated with input variables (e.g., nodes including text information of grammatical elements (such as sentences or words), position, and style, and edges including reflecting relationships between nodes) for the target model f. The associated labels are associated with the output variable (e.g., a target document attribute, such as belonging to a key-value pair or table) of the target model f. The training data may be updated based on, for example, feedback on the accuracy of the current target model f. Updated training data is fed back into the machine learning algorithm, which in turn updates the target model f.

In an embodiment, sets of training data 135 include datasets and associated labels. The datasets are associated with input variables (e.g., node attributes and edge attributes) for the target model f. The associated labels are associated with the output variable (e.g., node classifications and edge classifications) of the target model f. The training data may be updated based on, for example, feedback on the accuracy of the current target model f. Updated training data is fed back into the machine learning algorithm, which in turn updates the target model f.

In an example, the machine learning model training engine 115 initially trains a machine learning model 116, such as a graph convolutional network, using the pre-training data set 131, as described above. Training the graph convolutional network includes generating values in neurons of n hidden layers for the machine learning model and the functions/weights applied to each hidden layer to compute the neuron values for the next hidden layer. The training may further include determining the functions/weights to be applied to the final, n-th hidden layer that compute the final predictions for a data point.

The machine learning model training engine 115 trains the machine learning model 117 to identify target document attributes by generating embeddings representing nodes and edges in document graphs. While input data representing the nodes and edges include vectors representing defined and measurable values, such as a font size and text position, the machine learning model 117 generates embeddings comprising vectors encoding both specific categories and unmeasurable values representing learned correlations between nodes. For example, a node embedding generated by the machine learning model 117 may include tens or hundreds of vectors which do not directly correspond to classifications or measurable values. Instead, these vectors include learned values encoding relationships among attributes of nodes in a document graph 137. According to one embodiment, these vectors which do not directly correspond to classifications or measurable values are manifested within hidden layers of the machine learning model 117. The machine learning model 117 may output values identifying target document attributes—such as key—value pairs of nodes, or tokens in a document that belong to tables—without outputting all the vectors of the embeddings representing the nodes. Because pre-trained machine learning model 116 is used to initialize the machine learning model 117, the parameters of the machine learning model 117 are initialized to the values of the pre-trained model 116 to leverage the sentence and document graph semantics learned during the pre-training of model 116. As the machine learning model training engine 115 trains the machine learning model 117 on the training data set 135, the machine learning model training engine 115 iteratively adjusts the parameters of one or more layers of the machine learning model 117 to improve the accuracy of the machine learning model 117 in performing the downstream task, e.g., predicting target document attributes.

According to one embodiment, pre-training the machine learning model 116 and fine-tuning the machine learning model 117 include training a graph convolutional network (GCN). Training the GCN includes: (a) obtaining training data sets 131 and 135, (b) iteratively applying the training data sets to the GCN to (i) identify document graph modifications in pre-training, as described above, and (ii) predict labels, or classification values, for data points (representing nodes and edges of a document graph) of the training data set in the fine-tuning training, and (c) adjusting weights and offsets associated with the formulae that make up the neurons of the GCN based on a loss function that compares predictions to values associated with test labels. The neurons of the GCN include activation functions to specify bounds for a value output by the neurons. The activation functions may include differentiable nonlinear activation functions, such as rectified linear activation (ReLU) functions, logistic-type functions, or hyperbolic tangent-type functions. Each neuron receives the values of each neuron of the previous layer, applies a weight to each value of the previous layer, and applies one or more offsets to the combined values of the previous layer. The activation function constrains a range of possible output values from a neuron. A sigmoid-type activation function converts the neuron value to a value between 0 and 1. A ReLU-type activation function converts the neuron value to 0, if the neuron value is negative, and to the output value if the neuron value is positive. The ReLU-type activation function may also be scaled to output a value between 0 and 1. For example, after applying weights and an offset value to the values from the previous layer for one neuron, the system may scale the neuron value to a value between −1 and +1. The system may then apply the ReLU-type activation function to generate a neuron output value between 0 and 1. The system trains the GCN, e.g., using the training data set, a test data set, and a verification data set, until the labels generated by the trained GCN are within a specified level of accuracy, such as 98% accuracy.

According to one embodiment, the machine learning model training engine 115 trains the GCN using a graph convolutional kernel which (a) takes as input data (i) node attributes and (ii) edge attributes, (b) learns relationships among attributes of nodes, and (c) generates embeddings representing the nodes and edges which aggregate attributes of neighboring nodes and edges into an embedding for a particular node or edge, and which learns different weights to attribute to the neighboring nodes and edges based on relationships between the neighboring nodes and edges and a particular node. According to another example embodiment, the pre-trained machine learning model 116 and the fine-tuned machine learning model 117 are a graph neural networks (GNNs).

The content retrieval platform 110 stores the trained machine learning model 117. When the query execution engine 119 identifies a particular document 141, e.g., that satisfies parsing criteria such as the document includes content matching query terms, the document graph generating engine 111 generates a document graph of the document 141. The machine learning model engine 114 applies the machine learning model 117 to the document graph. According to an embodiment, the machine learning model 117 generates output values classifying nodes and edges as corresponding to target document attributes.

According to one embodiment, the content retrieval platform 110 includes a document graph decoder 118 to filter nodes and/or edges from a document graph based on the classifications of the nodes and/or edges by the machine learning model 117. According to one example embodiment, the machine learning model 117 classifies edges with "positive" or "negative" labels. The document graph decoder 118 identifies key-value pair groupings based on the labels generated by the machine learning model 117. For each edge labeled with a "negative" type label by the machine learning model 117, the document graph decoder 118 removes the edge from the document graph. The remaining edges include only edges belonging to key-value pair groupings. The document graph decoder 118 further extracts components containing at least two nodes. In other words, isolated nodes which were not connected by edges to other nodes are omitted from the decoded document graph. The document graph decoder 118 analyzes the node labels generated by the machine learning model 117 to identify, in each key-value pair grouping, the group of one or more nodes that comprise the key-portion and the group of one or more nodes that comprise the value-portion.

The query execution engine 119 identifies content in documents 141 which include the content matching query terms. The query execution engine 119 presents the content from the documents 141 in response to the query. The query execution engine 119 presents content based on target document attributes identified by the machine learning model 117. For example, in an embodiment in which the machine learning model 117 identifies key-value pair groupings in document graphs, the query execution engine 119 may present content from a set of values associated with a particular key, when the query execution engine 119 identifies content in the key matching query terms. As another example, the query execution engine 119 may present content in a table format the query execution engine 119 identifies content in a document that matches query terms, and the machine learning model 117 has identified the content as belonging to a table.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, the content retrieval platform 110 refers to hardware and/or software configured to perform one or more of the operations described herein for (a) executing queries, (b) pre-training a machine learning model with a pre-training data set, (c) modifying un-labeled document graph data to generate modified document graph data for the pre-training data set. (d) fine-tuning the machine learning model with a labeled data set to generate a fine-tuned machine learning model configured to perform a downstream task, such as content classifications for document content, and (e) using the fine-tuned machine learning model to generate predictions, e.g., as part of generating query responses based on the content classifications. Examples of operations for multi-stage training of a machine learning model are described below with reference to FIGS. 2A and 2B.

In an embodiment, the content retrieval platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 120 refers to hardware and/or software configured to facilitate communications between a user and the content retrieval platform 110. Interface 120 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 120 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 120 is specified in one or more other languages, such as Java, C, or C++.

3. MULTI-STAGE TRAINING OF A MACHINE LEARNING MODEL TO CLASSIFY DOCUMENT CONTENT

Figure 2A:
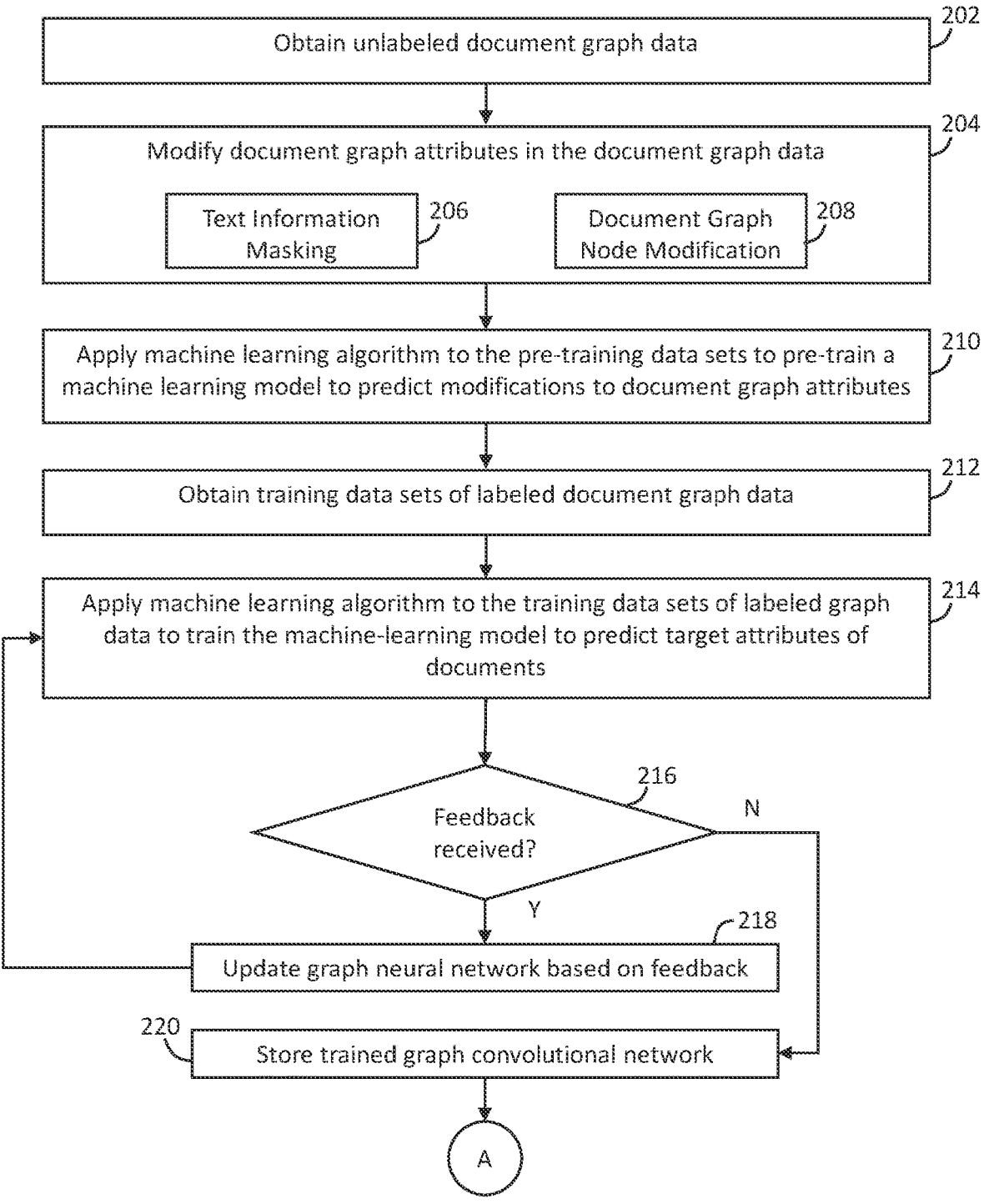
FIGS. 2A and 2B illustrate an example set of operations for modifying document graph attributes to create a training data set for pre-training a machine learning model in accordance with one or more embodiments.
Figure 2B:
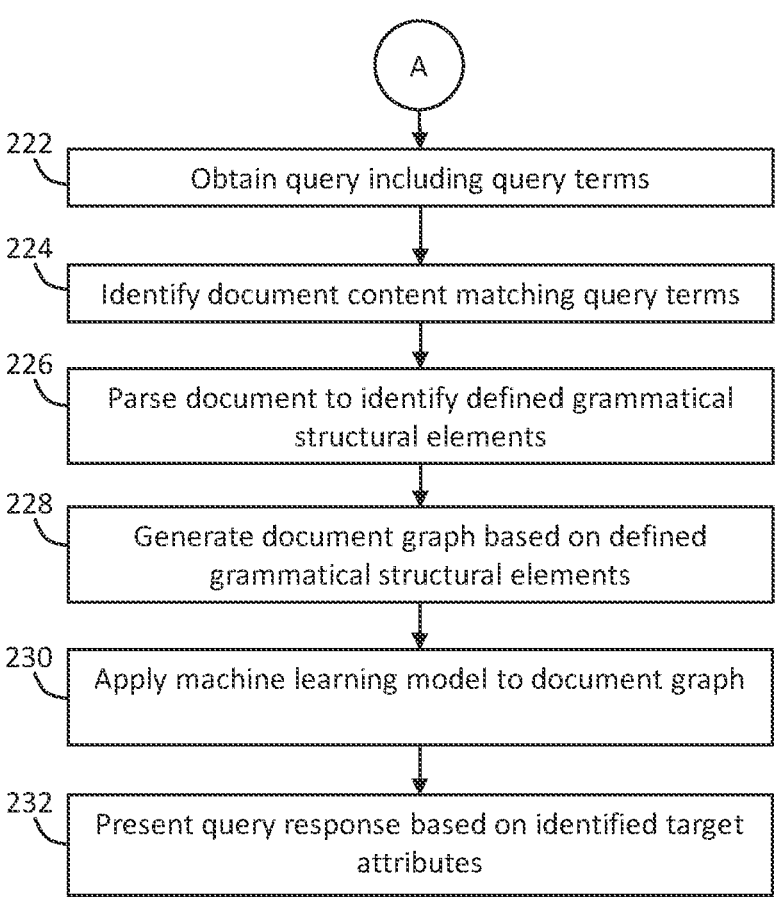

FIGS. 2A and 2B illustrate an example set of operations for multi-stage training of a machine learning model to classify document content in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

A system obtains sets of unlabeled document graph data (Operation 202). A particular document graph associated with a particular document identifies grammatical elements within the document. The document graph represents particular grammatical elements as nodes. The document graph connects nodes with edges. The nodes and edges are characterized by particular attributes. Node attributes include one or more of text font, text content, text style, text weight, text size, and a location, in a coordinate system, of text in the document. Edge attributes include, for a pair of nodes, one or more of differences in text size, text font, text color, and text style, differences in a page on which the text is located, a relative read order of one node to another node, and a relative layout of one node compared to another node. In one embodiment, the document graph represents sentences in a document as nodes.

The system modifies graph attributes in at least a subset of the document graph data (Operation 204). The system executes one or more automated document graph modification tasks to modify the graph attributes. The document graph modification tasks apply predefined rules to document graphs to generate modified document graphs without requiring intervening human input. While modifying a set of document graph data, the system generates labels according to the modifications. As a result, the system generates input training data (a modified document graph) and corresponding label data by which to train the machine learning model to predict whether document graphs include modifications, such as modified node or edge attributes.

Document graph modification tasks include one or both of text information masking (Operation 206) and document graph node modification (Operation 208). In text information masking (Operation 206), a system masks text information within a node of a document graph. For example, the system may create a modified document graph from which text content, text style, and/or text position for one or more nodes has been omitted/masked. The system may perform text information masking on a defined number of nodes in a node graph, such as 10% of the nodes in the node graph. In document graph node modification, the system modifies nodes in a document graph without masking text information. According to one example, a document graph modification task includes swapping text content between two nodes connected to the same edge. According to another example, a system replaces text content of a node in one document graph with text content taken from a node in another document graph.

The system pre-trains a machine learning model with a data set including at least the modified document graphs (Operation 210). According to one or more embodiments, the data set further includes un-modified document graphs, which are document graphs from which the system did not generate modified document graphs. For example, the system may generate modified document graphs from 50% of the document graphs in a training data set. In this example, the system provides as an input training data set to the machine learning model (a) the set of modified document graphs and (b) the 50% of the document graphs from which the system did not create modified document graphs. According to another example, the system modifies all document graphs for a given training data set. The system pre-trains the machine learning model, using the training data set, to set parameters of the model, such as coefficients and offsets associated with neurons of a GCN, to an initial set of values.

According to one embodiment, the system initiates different training tasks on the machine learning model to pre-train the machine learning model. One training task includes providing to the machine learning model a modified document graph in which text information has been omitted (text information masking) and generating, by the model, a prediction of the omitted information. Another training task includes providing to the machine learning model a modified document graph in which text content has been swapped or replaced in one or more nodes. The model predicts whether particular nodes in the document graph include swapped or replaced text content. In addition, or in the alternative, the model predicts whether particular edges in the document graph connect nodes for which text content has been swapped. The system may initiate the different training tasks on the same machine learning model. The system may provide the machine learning model with a first set of training document graph data to perform a text information masking type training task in which the machine learning model predicts omitted text information. The system may provide the machine learning model with a second set of training document graph data to perform a document graph node modification-type training task in which the machine learning model identifies whether nodes and/or edges in a document graph include, or connect nodes that include, swapped or replaced text content.

When the system masks text information in a modified document graph, the system applies the modified document graph data, with the masked text information omitted, as input data to pre-train a machine learning model. The machine learning model predicts what the omitted text information is. To illustrate, the machine learning model predicts embeddings of masked text content, where ground truth text content embeddings have been determined using a text embedding mode, such as the MUSE model.

When the system performs a document graph node modification-type training task, the system applies modified document graph data, with the swapped text content for the nodes, to the machine learning model as input data. The machine learning model predicts at least one of (a) whether a particular edge connects two nodes having swapped text content, and (b) whether a particular node includes text content that has been swapped with another node. When the document graph modification task includes replacing text of a particular node in one document graph with text content from a node in a different document, the system provides the modified document graph to the machine learning model as input training data. The system uses the automatically-generated labels associated with document graph nodes (such as "swapped", "replaced", and "unchanged") to determine the accuracy of the prediction of the machine learning model.

Subsequent to pre-training the machine learning model, the system obtains training data sets of labeled document graph data (Operation 212). The training data set includes labels associated with nodes and/or edges. The labels assign classifications to nodes and/or edges according to the presence or absence of target document attributes. For example, in one embodiment, the labels classify the nodes as a key, a value associated with the key, or "other," meaning the node is neither a key nor a value. According to an example embodiment, the nodes are sentences. The labels classify the nodes as sentences belonging to questions, belonging to answers, and "other," indicating the node belongs to neither a question nor an answer. According to another example embodiment, the labels classify tokens, such as words, in the document graph, as belonging to a table, a row, and/or a column.

The system applies a machine learning algorithm to the training data set to fine-tune the pre-trained machine learning model (a) classify nodes and edges based on embeddings, and/or (b) identify target attributes among nodes based on classification of nodes and edges (Operation 214). Types of machine learning models include, but are not limited to, linear regression, logistic regression, linear discriminant analysis, classification and regression trees, naïve Bayes, k-nearest neighbors, learning vector quantization, support vector machine, bagging and random forest, boosting, backpropagation, and/or clustering.

Training the graph neural network includes initializing model parameters to, or utilizing model parameters that are, the values determined from pre-training the model. Because the pre-training did not involve training for the target downstream task (such as is described above), the output of the graph neural network associated with a first document graph in the training data set results in inaccurate predictions whether nodes and edges are associated with key-type nodes, value-type nodes, positive-type edges, negative-type edges, or a same key-value pair grouping. As the training progresses, the system iteratively adjusts model parameters based on a loss function indicating an accuracy of predictions to generate more accurate predictions. The system iteratively generates predictions and adjusts model parameters based on the predictions until an accuracy of the graph neural network achieves a specified level, such as 98%.

In examples of supervising machine learning algorithms, the system may obtain feedback on the whether a particular classification by the machine learning model is correct (Operation 216). The feedback may affirm that a particular classification is correct. In other examples, the feedback may indicate that a particular classification or grouping is incorrect. Based on the feedback, the machine learning training set may be updated, such as using backpropagation, thereby improving its analytical accuracy (Operation 218). Once updated, the system may further train the machine learning model by optionally applying the model to additional training data sets.

Upon completion of the fine-tuning, such as by determining whether a model has achieved a desired accuracy level, the system stores the fine-tuned machine learning model (Operation 220).

The system obtains a query including particular query terms (Operation 222). The system may receive the query via a user interface. The user interface may include a voice-recognition interface. Accordingly, a user may verbally pose a question or a set of terms. The system may generate the query based on the spoken question or terms. In addition, or in the alternative, the interface may include a text interface. A user may input text content into the text interface. According to yet another example, the system may monitor user actions on a computer to automatically generate queries based on the user actions. For example, a user may enter search terms into a web browser. The system may identify the search terms and generate a query to access content in a data store which is not connected to the web browser.

The system identifies document content matching query terms (Operation 224).

The system parses the document to identify defined grammatical structural elements (Operation 226). Examples of defined grammatical structural elements include phrases, sentences, and lists. According to one example, the system identifies sentences, lists, logos, page numbers, dates, document titles, geographic addresses, and website addresses in the document. For example, the system may not identify phrases within the document as separate grammatical structural elements when the phrases are located within sentences. However, the system may identify phrases within the document as separate grammatical structural elements when the phrases are not contained within a sentence. In the description which follows, sentences will be used to describe defined grammatical structural elements. However, embodiments are not limited to identifying sentence-type grammatical structural elements. Instead, a system may be configured to identify any type of grammatical structural element (e.g., sentences, phrases, lists, dates, titles, numbers, addresses), or combination of grammatical structural elements.

The system generates a document graph based on sentences identified in the document (Operation 228). The system generates a separate node for each sentence. In addition, the system generates a node for other grammatical elements which are not part of a sentence-type grammatical structure, such as: a page number, a date, a web address, a document title, a document subtitle, and a list of items in non-sentence format.

The system generates edges connecting the nodes. The system generates an initial set of edges based on distances between nodes. According to one example, the system compares a coordinate position of a particular node with the coordinate positions of nodes located above, below, and to the sides of the particular node. If the nodes are within a predefined distance of each other, in the horizontal and/or vertical directions, the system generates an edge connecting the nodes.

In addition, or in the alternative, system generates edges between any two nodes within a defined reading order of each other. The system generates an edge between a center node and a particular number of nodes preceding and following the center node in a reading order of the document. According to one embodiment, determining a position of a node within a document includes determining, in a coordinate system, (a) a position of a right edge of the grammatical element corresponding to the node, (b) a position of a left edge of the grammatical element corresponding to the node, (c) a position of a bottom edge of the grammatical element corresponding to the node, and (d) a position of a top edge of the grammatical element corresponding to the node.

In addition, or in the alternative, system may generate edges between two nodes based, in part, on semantic content in the nodes. For example, system may generate an edge between two nodes having two or more subject-type words in common. As another example, system may generate an edge between two nodes having at least one word in common that is also a match to a received query term.

The system performs pre-processing of the information representing nodes and edges into vectors to provide the document graph data to a machine learning model as input data. A set of input data representing a node comprises n vectors and a set of data representing an edge comprises m vectors. The information contained in a node includes include text content, font weight (such as regular, italic, bold, combinations of bold and italic, etc.), and the location in the page of the sentence (such as the coordinates corresponding to the left, right, top, and bottom edges of the sentence in the document). Edges represent relationships between nodes. Values represented by vectors in the edges include relative relationships between: font size (is a font size of one node greater, equal to, or less than the font size of the other node), font color (is the font size of one node the same, or different from, the font size of the other node), a page (are two nodes on the same page or different pages), a relative reading order of the nodes (is one node in a reading order position preceding, or following, the other node), and a relative layout of the nodes (what is the difference between (a) the left edges of the nodes, (b) the right edges of the nodes, (c) the tops of the nodes, and (d) the bottoms of the nodes, and what are the horizontal and vertical distances between the nodes (e.g., what is a difference between the left side of one node and the right side of the other node)).

The system applies the fine-tuned machine learning model to the document graph (Operation 230). Applying the machine learning model to the document graph includes classifying nodes and edges based on embeddings. For example, the machine learning model may identify nodes within a selected document graph that include target document attributes, such as being part of a key-value pair or being part of a table.

The system presents content from a document, from which the selected document graph was generated, in response to the query (Operation 232). The system presents the content based on the target document attributes identified in the document graph. For example, the system may identify content, within a key-type node of a key-value pair grouping, which matches one or more query terms. The system may present a value-type node (e.g., text content which makes up the text of the value-type node) in response to the query. In addition, or in the alternative, the system may present content from both (a) the key-type node including the content matching the query terms, and (b) a value-type node associated with the key-type node.

In an example in which the key-value pair grouping is a question-answer pair grouping, the system may identify content in a question that matches one or more query terms. The system may present a corresponding answer from the document in response to the query.

4. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
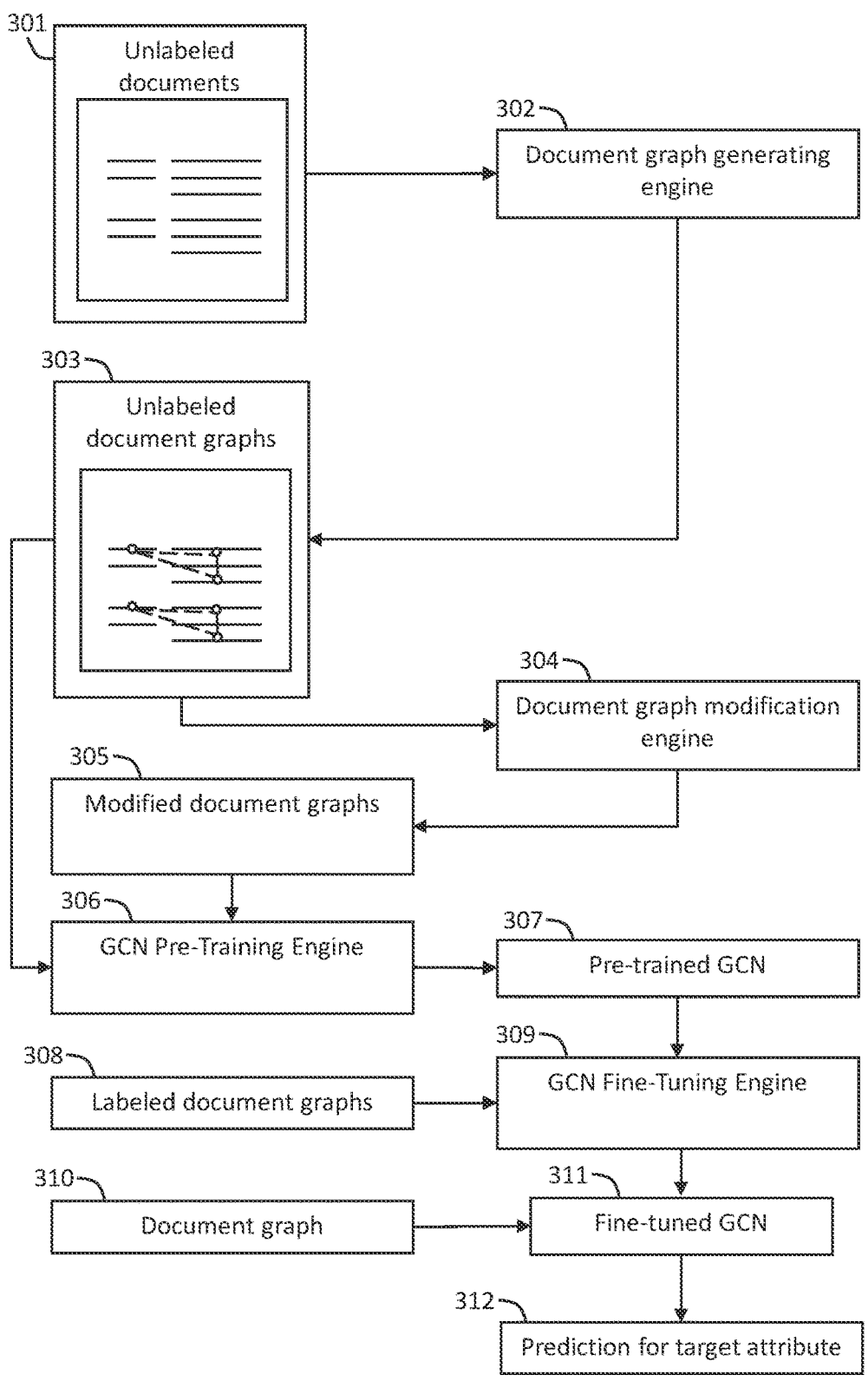
FIGS. 3A-3D illustrate an example set of operations for in accordance with one or more embodiments.

Referring to FIG. 3A, a document graph generating engine 302 generates a set of unlabeled document graphs 303 from a set of unlabeled documents 301. The unlabeled documents 301 and unlabeled document graphs refer to documents and document graphs that are not provided with training labels for purposes of training a machine learning model. The unlabeled documents may include a variety of types of documents or a particular type of document. Examples of document types include: book excerpts, articles, journal entries, magazine articles and excerpts, invoices, receipts, and frequently-asked-question-type documents.

The document graph generating engine 302 converts the content of the document into a document graph comprising nodes and edges. The document graph generating engine 302 generates a separate node for each sentence and for page elements which are not part of sentences including: (a) a list, (b) a document title, (c) a logo, (d) a page number, (c) a document date, and (f) a web address.

The document graph generating engine 302 generates edges to connect the nodes. The document graph generating engine 302 generates an initial set of edges based on a combination of (a) a relative position, in the document, of two nodes relative to each other, and (b) a relative position, in a read order, of two nodes relative to each other. Generating the initial set of edges based on the relative position of two nodes in the document includes determining one or more of: the difference between (a) the left edges of the nodes, (b) the right edges of the nodes, (c) the tops of the nodes, (d) the bottoms of the nodes, and (c) the horizontal and vertical distances between the nodes (e.g., the difference between the left side of one node and the right side of the other node, and/or the difference between the bottom side of one node and the top side of another node).

Generating the initial set of edges based on the relative position of two nodes in a read order of the document includes: (a) determining a read order of the document, including left-to-right, top-to-bottom, and from a bottom of one column or page to a top of a next column or page, (b) identifying a defined number of nodes preceding a target node in read order, and (c) identifying a defined number of nodes following the target node in the read order.

Figure 3B:
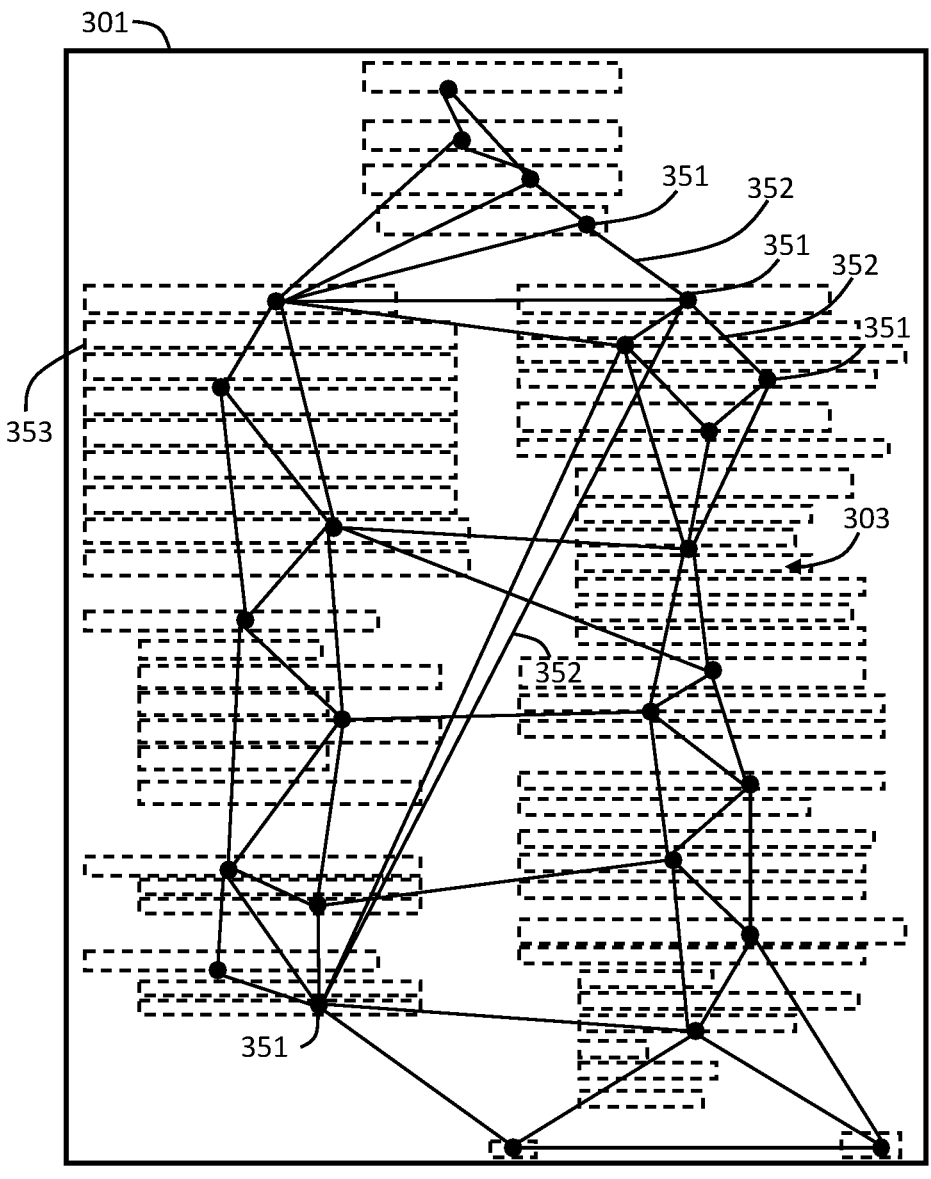

FIG. 3B illustrates a document graph 303 generated for the document 301 including the initial set of edges 352 based on node coordinate position and node read order position. The document graph 303 includes nodes 351 and edges 352. Each dot in FIG. 3B represents a separate node. Each line represents a separate edge. Dashed boxes represent document text content 353. The words and symbols of the text content 353 are not shown in order to more clearly depict the document graph 303.

The edges 352 represent relationships between nodes. The edges comprise attribute values representing relative relationships between: font size (is a font size of one node greater, equal to, or less than the font size of the other node), font color (is the font size of one node the same, or different from, the font size of the other node), a page (are two nodes on the same page or different pages), a relative reading order of the nodes (is one node in a reading order position preceding, or following, the other node), and a relative layout of the nodes (what is the difference between (a) the left edges of the nodes, (b) the right edges of the nodes, (c) the tops of the nodes, and (d) the bottoms of the nodes, and what are the horizontal and vertical distances between the nodes (e.g., what is a difference between the left side of one node and the right side of the other node)).

Figure 3C:
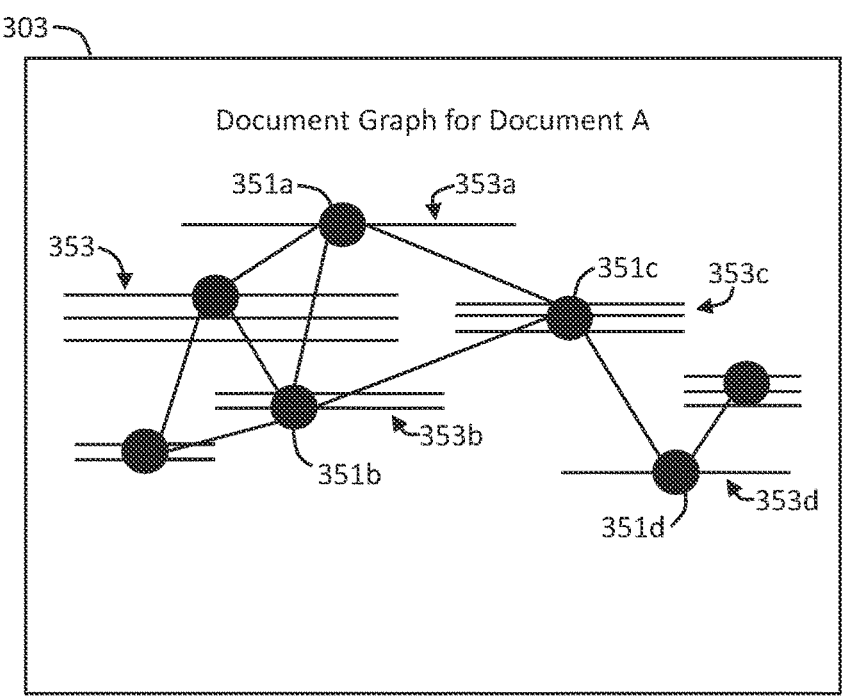
Figure 3C:
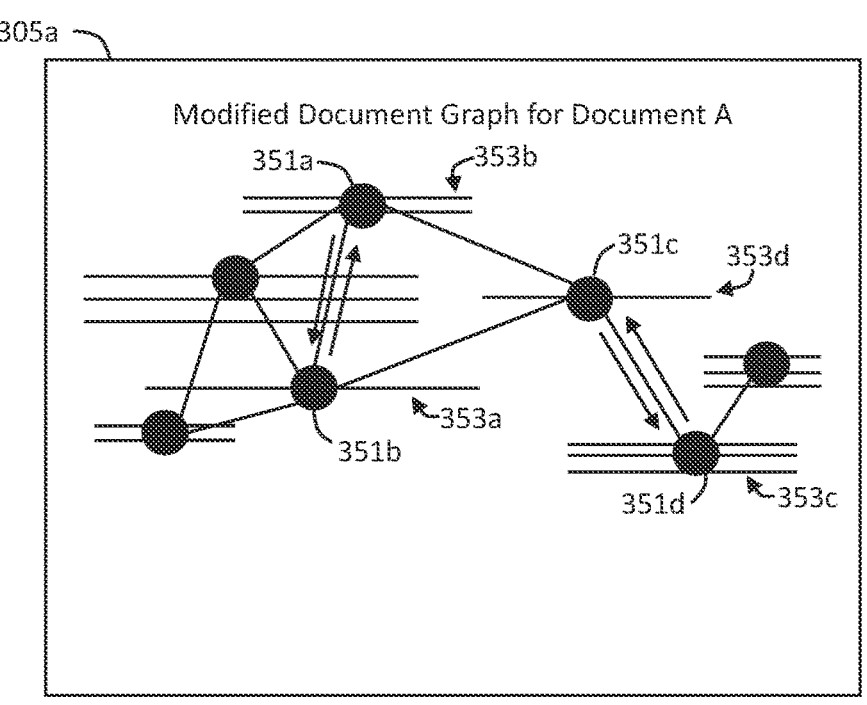
Figure 3D:
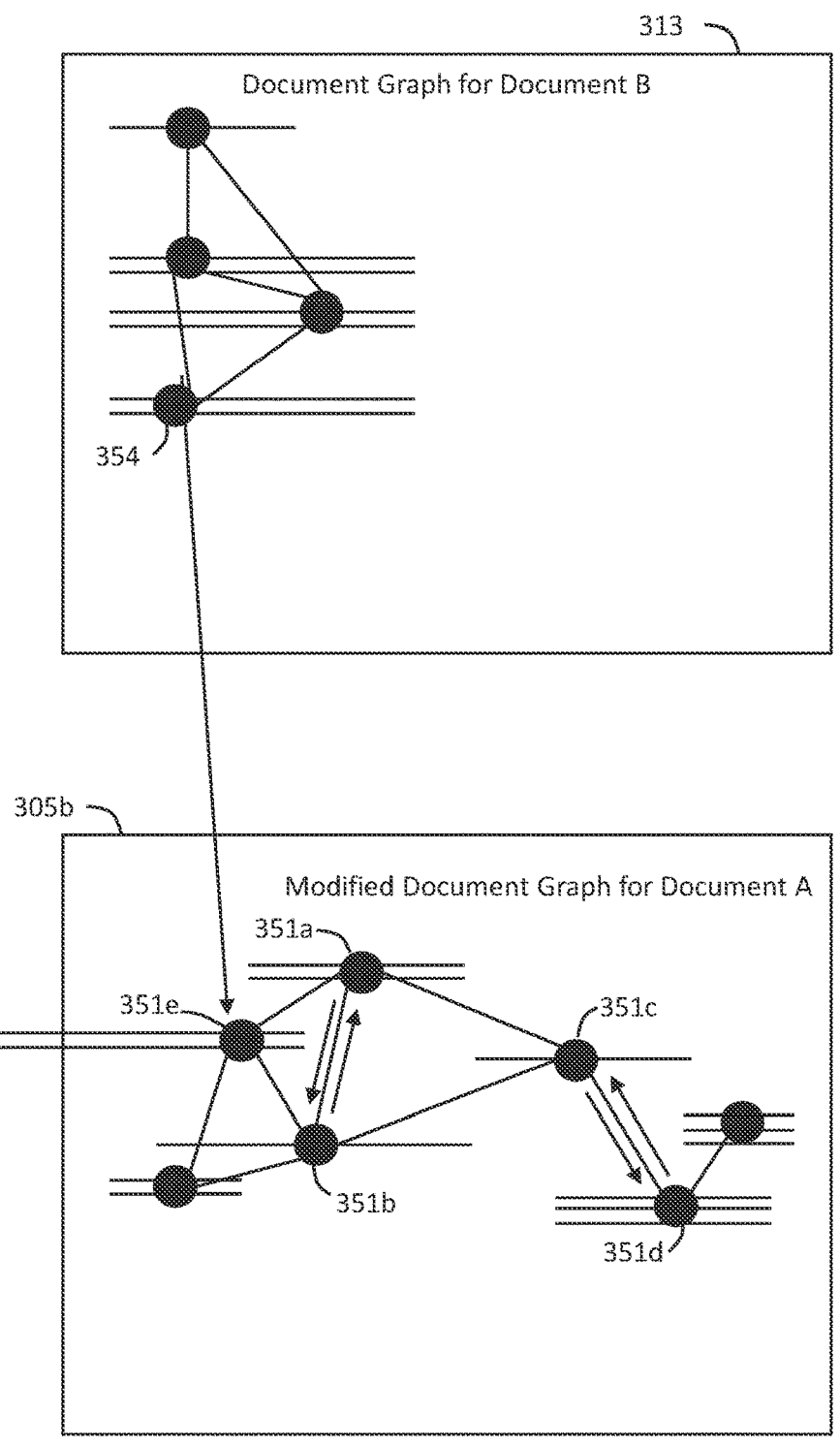

A document graph modification engine 304 generates modified document graphs 305 from the unlabeled document graphs 303 by performing automated document graph modification tasks upon at least a subset of the unlabeled document graphs 303. FIGS. 3C and 3D illustrate examples of modifying a document graph.

The document graph 303 includes nodes 351a-351d. In FIGS. 3C and 3D, the lines under the dots represent text content in the document from which the document graph 303 was generated. The lines representing the text content 353 are positioned under the respective nodes including the text content. In the document graph 303, node 351a encodes text content 353a, node 351b encodes text content 353b, node 351c encodes text content 353c, and node 351d encodes text content 353d. The document graph modification engine 304 modifies the document graph 303 to generate document graph 305a by swapping the text content 353a with text content 353b. In other words, the document graph modification engine stores text content 353a in node 351b and text content 353b in node 351a. Likewise, the document graph modification engine 304 stores text content 353*c* in node 351*d* and text content 353*d* in node 351*c*.

Referring to FIG. 3D, the document graph modification engine 304 further modifies the modified document graph 305*b* by replacing the text content of node 351*e* with the text content from node 354 in a separate document graph 313.

According to various embodiments, graph modification engine 304 automatically generates labels for the nodes in modified document graphs 305. Specifically, graph modification engine 304 labels each node as "swapped", "unmodified", or "replaced" to reflect any modification actions (or lack thereof) that were performed for the various nodes. According to an embodiment, graph modification engine 304 labels nodes as "swapped" or "replaced" to reflect any modification actions that were performed for the various nodes, and the lack of a label is automatically interpreted as an "unmodified" label.

The document graph modification engine 304 performs the document graph modification tasks on the document graphs automatically and without human intervention to generate the modified document graphs 305. For example, a system may provide the document graph modification engine 304 with a set of document graph modification rules. A human may set parameters for the rules. A set of document graph modification rules may include: perform text masking (masking text content in nodes) in 10% of document graphs in a set of document graphs, perform node swapping (swapping text content) in 10% of the document graphs, perform node replacement (replacing text content in a node with text content from a node from another document graph) in 10% of the document graphs, perform node swapping in 20% of nodes in document graphs in which node swapping is performed, and perform node replacement in 30% of nodes in document graphs in which node replacement is performed.

Once the rules are specified, the document graph modification engine 304 applies the rules to sets of unlabeled document graphs to perform the document modification tasks without human intervention. In other words, humans do not (a) observe the document graph data, (b) select document graphs to be modified, or (c) select nodes to be modified in the document graphs.

Based on the modifications to the document graphs, a graph convolutional network (GCN) pre-training engine 306 generates a labeled pre-training data set to pre-train a GCN 307. The GCN pre-training engine 306 labels modified document graphs 305 with labels specifying the modifications (e.g., "swapped nodes A and B," embeddings of masked text, "text content masked: 'Selecting a plan includes . . . '", etc.). The GCN pre-training engine 306 labels un-modified document graph nodes in graphs 303 with labels indicating the document graph nodes are not modified. As noted above, the labeling of the document graph data for training the GCN may be performed by the GCN pre-training engine 306 based on the automated document graph modification tasks and without human intervention. In other words, a human does not generate labels for the pre-training data set.

The GCN pre-training engine 306 pre-trains the GCN using (a) the modified document graphs 305 and (b) unlabeled document graphs 303 (if any) which were not used to generate the modified document graphs 305. Training the GCN results in the pre-trained GCN 307 with an initial set of parameter values.

A GCN fine-tuning engine 309 obtains a set of labeled document graphs 308. To illustrate, the set of labeled document graphs 308 includes labels associated with nodes indicating whether the nodes correspond to a target attribute. For example, the labels indicate whether a particular node is a key or a value of a key-value pair. The GCN fine-tuning engine 309 fine-tunes the GCN using the labeled document graphs 308 to generate the fine-tuned GCN 311.

Subsequent to fine-tuning the GCN 311, the fine-tuned GCN 311 obtains a document graph 310. For example, a system may identify content in a document that matches query terms. The system may obtain the document to return document content in response to the query. The system applies the fine-tuned GCN 311 to the document graph 310 to generate a prediction for a target attribute 312 associated with the document graph 310. For example, the GCN 311 may identify nodes in the document graph 310 that correspond to key-value pairs. Alternatively, the GCN 311 may identify nodes in the document graph that correspond to table content.

In the example embodiment described above, since the system performs, without human intervention, the generation of document graphs, the modification of the document graphs, the creation of the training data set including modified and, potentially, unmodified document graphs, and the pre-training of the GCN with the training data set of modified document graphs, the system is able to improve the accuracy of the fine-tuned GCN for predicting target document attributes without requiring increased human supervision of the pre-training stage of the GCN.

5. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
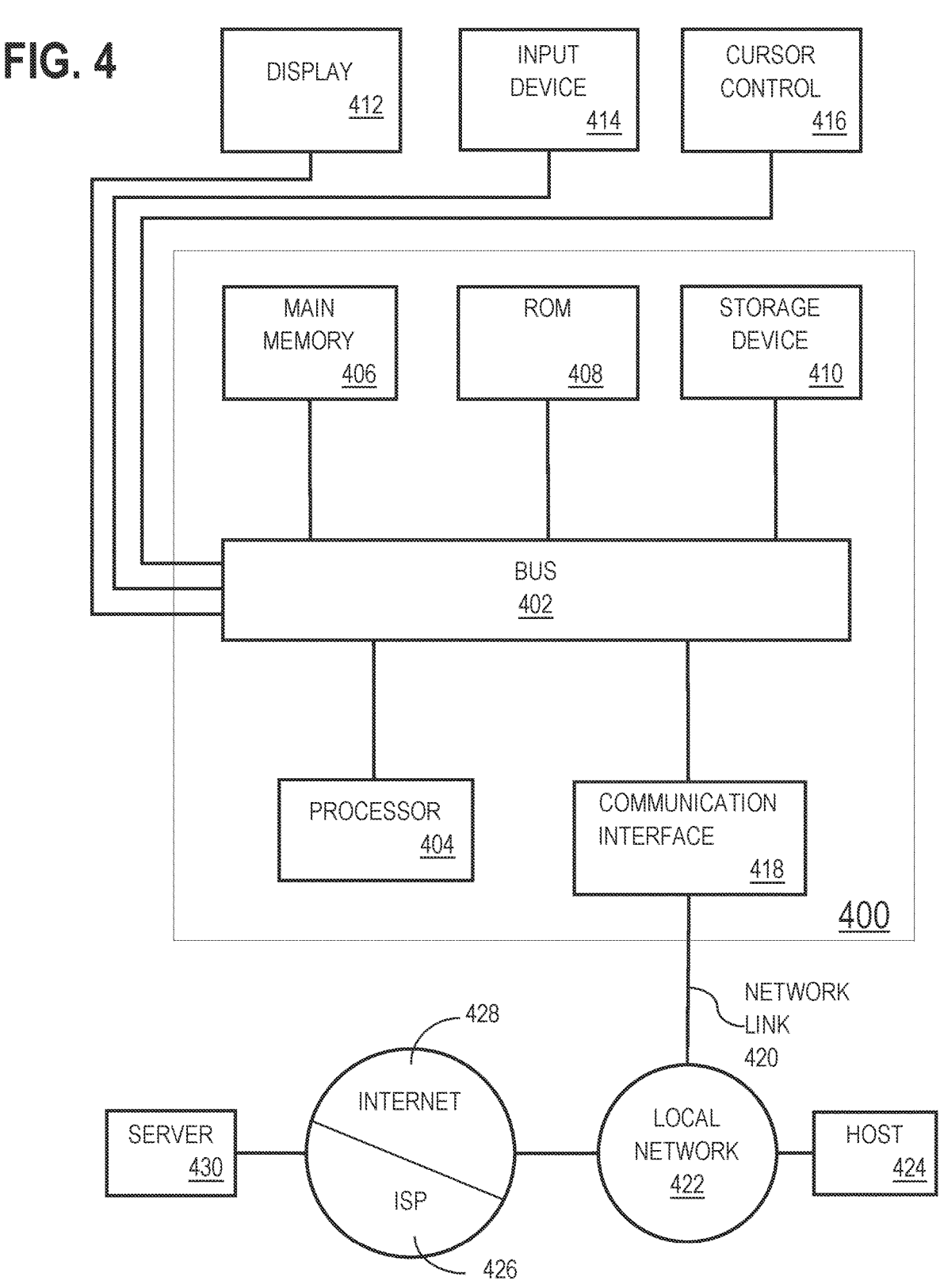
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:

executing an unsupervised first training stage for training a machine learning model to predict document graph attributes at least by:

accessing a set of unlabeled training data comprising a first set of document graphs corresponding to a first set of documents;

wherein a first document graph in the first set of document graphs comprises:

a first node corresponding to a first grammatical element comprising a plurality of tokens in a first document of the first set of documents, the first node comprising first text information for the first grammatical element in the first document and at least one of first positional information representing a first position of a first text content in a first document and first font style data for the first text content;

a second node corresponding to a second grammatical element in the first document, the second node comprising second text information for the second grammatical element in the first document and at least one of second positional information representing a second position of a second text content in the first document and second font style data for the second text content; and a first edge connecting the first node and the second node, the first edge comprising relationship information reflecting a relationship of the first node to the second node, wherein the relationship information includes at least one of:

a read-order relationship of the first text content and the second text content;

a coordinate location relationship of the first text content and the second text content; and a relationship of the first font style data to the second font style data;

generating a training dataset for the unsupervised first training stage of the machine learning model by generating a set of modified document graph data based on the first set of document graphs, wherein generating the training dataset for the unsupervised first training stage of the machine learning model comprises:

executing a graph-data-modification process to modify document graph attributes of at least the first node to generate a first set of modified document graph data corresponding to the first document, the first set of modified document graph data including the modified document graph attributes of the first node; and training the machine learning model with the training dataset by iteratively applying the machine learning model to document graphs in the training dataset to predict the modified document graph attributes, at least by:

applying the machine learning model to a particular document graph in the training dataset to predict a particular document attribute of the particular document, wherein the particular document attribute corresponds to the modified document graph data;

comparing the prediction by the machine learning model to an unmodified document graph corresponding to the particular document graph to determine whether the prediction is correct; and updating parameters of the machine learning model based on results of comparing the prediction to the unmodified document graph.

2. The one or more non-transitory computer readable media of claim 1, wherein the set of unlabeled training data further includes a second set of document graphs corresponding to a second set of documents, wherein training the machine learning model includes training the machine learning model based on (a) the set of modified document graph data, and (b) a set of unmodified document graph data obtained from the second set of document graphs.

3. The one or more non-transitory computer readable media of claim 1, wherein the machine learning model is a graph convolutional network (GCN) model.

4. The one or more non-transitory computer readable media of claim 1, wherein the graph-data-modification process includes masking the first text information in the first node, and wherein training the machine learning model on the set of modified document graph data to predict the modified document graph attributes comprises training the machine learning model to predict the masked first text information.

5. The one or more non-transitory computer readable media of claim 4, wherein the first text information is embedded data representing the first text content, and wherein training the machine learning model on the set of modified document graph data to predict the modified document graph attributes includes training the machine learning model to predict the embedded data for the masked first text information.

6. The one or more non-transitory computer readable media of claim 5, wherein executing the graph-data-modification process includes leaving at least one of the first positional information and the first font style data of the first grammatical element unchanged in the set of modified document graph data while masking the first text information.

7. The one or more non-transitory computer readable media of claim 1, wherein the graph-data-modification process includes swapping the first text content of the first node with the second text content of the second node, and wherein training the machine learning model with the training dataset to predict the modified document graph attributes includes training the machine learning model to predict whether the first edge connects two nodes in which the first text content has been swapped with the second text content.

8. The one or more non-transitory computer readable media of claim 1, wherein the graph-data-modification process includes swapping the first text content of the first node with the second text content of the second node, and wherein training the machine learning model with the training dataset to predict the modified document graph attributes includes training the machine learning model to predict whether the first text content is swapped with the second text content.

9. The one or more non-transitory computer readable media of claim 1, wherein the graph-data-modification process includes replacing first text content of the first node with second text content from a third node in a second document graph representing a third grammatical element in another document, and wherein training the machine learning model with the training dataset to predict the modified document graph attributes includes training the machine learning model to predict whether the first text content in the first node has been replaced by the second text content.

10. The one or more non-transitory computer readable media of claim 1, wherein the operations further comprise:

executing a second training stage for fine-tuning the machine learning model to predict target attributes in a set of target documents at least by:

obtaining a set of labeled training data; and training the machine learning model on the set of labeled training data to predict the target attributes in the set of target documents.

11. The one or more non-transitory computer readable media of claim 10, wherein predicting the target attributes comprises one of:

identifying key-value pair groupings in the set of target documents; and identifying tables in the set of target documents.

12. A method comprising:

executing an unsupervised first training stage for training a machine learning model to predict document graph attributes at least by:

accessing a set of unlabeled training data comprising a first set of document graphs corresponding to a first set of documents;

wherein a first document graph in the first set of document graphs comprises:

a first node corresponding to a first grammatical element comprising a plurality of tokens in a first document of the first set of documents, the first node comprising first text information for the first grammatical element in the first document and at least one of first positional information representing a first position of a first text content in a first document and first font style data for the first text content;

a second node corresponding to a second grammatical element in the first document, the second node comprising second text information for the second grammatical element in the first document and at least one of second positional information representing a second position of a second text content in the first document and second font style data for the second text content; and a first edge connecting the first node and the second node, the first edge comprising relationship information reflecting a relationship of the first node to the second node, wherein the relationship information includes at least one of:

a read-order relationship of the first text content and the second text content;

a coordinate location relationship of the first text content and the second text content; and a relationship of the first font style data to the second font style data;

generating a training dataset for the unsupervised first training stage of the machine learning model by generating a set of modified document graph data based on the first set of document graphs, wherein generating the training dataset for the unsupervised first training stage of the machine learning model comprises:

executing a graph-data-modification process to modify document graph attributes of at least the first node to generate a first set of modified document graph data corresponding to the first document, the first set of modified document graph data including the modified document graph attributes of the first node; and training the machine learning model with the training dataset by iteratively applying the machine learning model to document graphs in the training dataset to predict the modified document graph attributes, at least by:

applying the machine learning model to a particular document graph in the training dataset to predict a particular document attribute of the particular document, wherein the particular document attribute corresponds to the modified document graph data;

comparing the prediction by the machine learning model to an unmodified document graph corresponding to the particular document graph to determine whether the prediction is correct; and updating parameters of the machine learning model based on results of comparing the prediction to the unmodified document graph.

13. The method of claim 12, wherein the set of unlabeled set of training data further includes a second set of document graphs corresponding to a second set of documents, wherein training the machine learning model includes training the machine learning model based on (a) the set of modified document graph data, and (b) a set of unmodified document graph data obtained from the second set of document graphs.

14. The method of claim 12, wherein the machine learning model is a graph convolutional network (GCN) model.

15. The method of claim 12, wherein the graph-data-modification process includes masking the first text information in the first node, and wherein training the machine learning model on the set of modified document graph data to predict the modified document graph attributes comprises training the machine learning model to predict the masked first text information.

16. The method of claim 15, wherein the first text information is embedded data representing the first text content, and wherein training the machine learning model on the set of modified document graph data to predict the modified document graph attributes includes training the machine learning model to predict the embedded data for the masked first text information.

17. The method of claim 16, wherein executing the graph-data-modification process includes leaving at least one of the first positional information and the first font style data of the first grammatical element unchanged in the set of modified document graph data while masking the first text information.

18. The method of claim 12, wherein the graph-data-modification process includes swapping the first text content of the first node with the second text content of the second node, and wherein training the machine learning model with the training dataset to predict the modified document graph attributes includes training the machine learning model to predict whether the first edge connects two nodes in which the first text content has been swapped with the second text content.

19. The method of claim 12, wherein the graph-data-modification process includes swapping the first text content of the first node with the second text content of the second node, and wherein training the machine learning model with the training dataset to predict the modified document graph attributes includes training the machine learning model to predict whether the first text content is swapped with the second text content.

20. A system comprising:

one or more processors; and memory storing instructions that, when executed by the one or more processors, cause the system to perform:

executing an unsupervised first training stage for training a machine learning model to predict document graph attributes at least by:

accessing a set of unlabeled training data comprising a first set of document graphs corresponding to a first set of documents;

wherein a first document graph in the first set of document graphs comprises:

a first node corresponding to a first grammatical element comprising a plurality of tokens in a first document of the first set of documents, the first node comprising first text information for the first grammatical element in the first document and at least one of first positional information representing a first position of a first text content in a first document and first font style data for the first text content;

a second node corresponding to a second grammatical element in the first document, the second node comprising second text information for the second grammatical element in the first document and at least one of second positional information representing a second position of a second text content in the first document and second font style data for the second text content; and a first edge connecting the first node and the second node, the first edge comprising relationship information reflecting a relationship of the first node to the second node, wherein the relationship information includes at least one of:

a read-order relationship of the first text content and the second text content;

a coordinate location relationship of the first text content and the second text content; and a relationship of the first font style data to the second font style data;

generating a training dataset for the unsupervised first training stage of the machine learning model by generating a set of modified document graph data based on the first set of document graphs, wherein generating the training dataset for the unsupervised first training stage of the machine learning model comprises:

executing a graph-data-modification process to modify document graph attributes of at least the first node to generate a first set of modified document graph data corresponding to the first document, the first set of modified document graph data including the modified document graph attributes of the first node; and training the machine learning model with the training dataset by iteratively applying the machine learning model to document graphs in the training dataset to predict the modified document graph attributes, at least by:

applying the machine learning model to a particular document graph in the training dataset to predict a particular document attribute of the particular document, wherein the particular document attribute corresponds to the modified document graph data;

comparing the prediction by the machine learning model to an unmodified document graph corresponding to the particular document graph to determine whether the prediction is correct; and updating parameters of the machine learning model based on results of comparing the prediction to the unmodified document graph.

\* \* \* \* \*